United States Patent
Wan et al.

(10) Patent No.: US 8,335,152 B2
(45) Date of Patent: Dec. 18, 2012

(54) METHOD AND TRANSMISSION UNIT FOR ADAPTIVE CODING, MODULATION AND TRANSMISSION OF DATA WORDS IN A WIRELESS COMMUNICATION SYSTEM

(75) Inventors: Lei Wan, Beijing (CN); Johan Axnäs, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 873 days.

(21) Appl. No.: 12/092,199

(22) PCT Filed: Nov. 4, 2005

(86) PCT No.: PCT/SE2005/001665
§ 371 (c)(1),
(2), (4) Date: May 21, 2008

(87) PCT Pub. No.: WO2007/053071
PCT Pub. Date: May 10, 2007

(65) Prior Publication Data
US 2008/0232340 A1    Sep. 25, 2008

(51) Int. Cl.
*H04J 11/00* (2006.01)
(52) U.S. Cl. ........................................................ 370/207
(58) Field of Classification Search .................... None
See application file for complete search history.

(56) References Cited

U.S. PATENT DOCUMENTS

| | | | |
|---|---|---|---|
| 5,991,635 A * | 11/1999 | Dent et al. | 455/517 |
| 2003/0043732 A1 | 3/2003 | Walton et al. | |
| 2003/0223354 A1 | 12/2003 | Olszewski | |
| 2005/0180374 A1 | 8/2005 | Balachandran et al. | |
| 2006/0193294 A1 | 8/2006 | Jorswieck et al. | |
| 2008/0232340 A1 * | 9/2008 | Wan et al. | 370/343 |
| 2009/0141681 A1 * | 6/2009 | Hwang et al. | 370/329 |

FOREIGN PATENT DOCUMENTS

| | | |
|---|---|---|
| RU | 2169431 C1 | 6/2001 |
| RU | 2251814 C1 | 5/2005 |
| WO | WO 2005/076725 A2 | 8/2005 |

OTHER PUBLICATIONS

Ming Lei; Ping Zhang, Subband bit and power loading for adaptive OFDM, Vehicular Technology Conference, 2003. VTC 2003-Fall. 2003 IEEE 58th, vol. 3, pp. 1482-1486 vol. 3, Oct. 6-9, 2003 p. 1. col. 2,line 9-p. 1, col. 2,line 28.

* cited by examiner

*Primary Examiner* — Kevin C. Harper
*Assistant Examiner* — Leon Andrews

(57) ABSTRACT

When transmitting data from a transmission unit to a reception unit over a channel in a wireless communication system, it has been observed that there are inherent losses in throughput, especially for a channel experiencing high channel quality variations over its frequency range. To improve the throughput over such a channel, it is proposed to: estimate the quality of each subchannel of a channel. classify the subchannels into a number of quality groups based on the estimated quality, and select a code rate per quality group. This selected code rate per quality group is then used when a data word to be transmitted is coded. Simulations have shown that by grouping the subchannels into a limited number of groups, for example one to four groups depending on the channel quality variation, a high throughput could be achieved with a minimum of signaling cost in the form of extra overhead.

21 Claims, 6 Drawing Sheets

METHOD AND TRANSMISSION UNIT FOR ADAPTIVE CODING, MODULATION AND TRANSMISSION OF DATA WORDS IN A WIRELESS COMMUNICATION SYSTEM

FIELD OF THE INVENTION

The present invention relates to methods and transmission units for coding, modulating and transmitting data words in a wireless communication system, and more particularly it relates to coding, modulating and transmitting data words to a receiver over a channel such that a high throughput over the channel is achieved.

BACKGROUND OF THE INVENTION

Data that is to be transmitted from a transmitter to a receiver in a communication system is in general coded and modulated before it is transmitted over a link between the transmitter and the receiver.

In wireless communication systems, the link between the transmitter and the receiver is a wireless link. In this document this link is hereafter called a channel. The channel uses a frequency interval for the transmission of data. The channel may be divided into subchannels, each subchannel using a fraction of the frequency interval for transmitting data. Data is encoded and modulated before it is transmitted over the channel. In communication systems in general, one modulation and coding scheme is used for coding and modulating all data to be transmitted over a link from a transmitter to a receiver within a certain time period called e.g. transmission time interval (TTI) or time frame.

In wireless systems, such as GSM, W-CDMA, CDMA2000, WIMAX etc., the quality of the channel over the frequency interval could vary much more than the quality of the link in fixed communication systems. As a result, a coded data word will typically be transmitted over subchannels experiencing different quality. The quality of a channel could be estimated by measuring e.g. signal to interference and noise ratio (SINR) over the frequency interval. For wideband wireless systems, the channel covers a broad frequency range, i.e. the frequency interval is broad. Therefore, the channel quality variation over the whole frequency interval within a TTI is normally higher than for narrowband systems.

For this reason, channel adaptation is widely used, whereby modulation and coding scheme is dynamically selected for the channel according to channel condition, e.g. the quality of the channel. This is done for example in the wireless technologies High Speed Downlink Packet Access (HSDPA) or CDMA Evolution Data Only (CDMA EV-DO). CDMA EV-DO is the $1^{st}$ step of CDMA2000 evolution with some channels for data-service-only, in addition to the traditional channels that support speech services only. In existing wireless communication systems, channel adaptation is traditionally designed such that a single modulation mode and a single code rate is used per TTI or time frame for the channel. I.e. the same code rate and the same modulation mode is used per TTI to code and modulate data onto all subchannels used for the transmission.

When transmitting data over a channel, there is an interest to achieve a high throughput over a channel for a certain transmit power level.

Simulations performed by the inventors show that there are inherent losses in throughput for a channel experiencing high channel quality variation. According to the simulation results, there is a need for a lower uniform coding rate if a channel experiences high channel quality variation than if the channel experiences low channel quality variation. Or seen in another way, the larger the quality variation, the higher transmit power is needed to achieve the same target block error rate (BLER). These simulation results are shown in the diagram of FIG. 1. In the simulations, each subchannel of one channel could take either a first or a second Signal to Noise Ratio (SNR) state. The example figures are given as SNR since they are link simulation results or single-cell simulation results, where SNR equals SINR. The curves in the diagram show required average SNR and corresponding required code rate for achieving a certain BLER. Each curve corresponds to a certain offset in dB between the two SNR states. As can be seen in FIG. 1, for a certain average SNR, there is a need for a lower coding rate to achieve the same BLER when the two SNR states are widely separated compared to when they are more close to each other. For example, when the two states have the same level, i.e. are offset with 0 dB (the 0 dB curve), the coding rate could be 0.9 for an average SNR level of 8 dB, but when the two states are offset with 30 dB, (see the 30 dB curves, i.e. the curve furthest up in the diagram) but still an average SNR level of 8 dB is used, the coding rate has to be 0.43. Inversely, when the two states are offset with 0 dB, and a coding rate of 0.43 is used, an average SNR level of 0 dB could be used, compared to an average SNR level of 8 dB for the case of 30 dB offset and with the same coding rate of 0.43 to achieve the same BLER.

To further give some hints of the influence of the channel quality variance on the channel throughput, further simulations resulted in the four diagrams of FIG. 2. The diagrams of FIG. 2 show the normalized throughputs for different channel quality conditions. In FIG. 2, the SNR is assumed to be log-Normal distributed. In the upper left diagram, the standard deviance for the SNR over the channel is 5 dB, in the upper right diagram it is 10 dB, in the lower left diagram 15 dB and in the lower right diagram it is 20 dB. The continuous line in each diagram shows the throughput for perfect link adaptation, i.e. when each subchannel has been allocated an individual modulation and coding scheme (MCS), based on its SNR level (or state). The broken line in each diagram shows the throughput for single MCS selection per frame, i.e. when one modulation and coding scheme has been selected for all subchannels, regardless of SNR level. In the simulations the same code block size has been used for both single MCS and perfect link adaptation, such that the single MCS and perfect link adaptation methods can be compared, irrespective of block size. Also, no regards has been taken to possible differences in size of necessary overhead information. The modulation in FIG. 2 has been selected among the modulation schemes BPSK, QPSK, 16QAM, 64QAM, for both the single MCS case and the perfect link adaptation case. Since two bits per OFDM symbol have to be used to communicate to the receiver which modulation scheme has been used, the normalized throughput increases from 0 to a maximum of 6 bits/symbol with the increasing of the expectation of SNR in dB of the multi-state channel.

FIG. 2 shows that there is a gap in throughput between the case when the same MCS is used for the whole channel, and the case when an individual MCS is selected for each subchannel, when the assumption of same block size and same amount of overhead information is used. FIG. 2 also shows that the gap increases the larger the channel variation. I.e. the simulations have shown that there is an obvious space for improvement of the link adaptation when channel varies significantly during one TTI/frame. It may be noted that the performance difference shown in FIG. 2 pertains to practical codes and code block sizes. In the ideal case of perfect codes and infinitely large code blocks, the performance difference would be expected to vanish when the same block size is used.

As shown above, the drawbacks of the single MCS selection per frame or TTI include:

Throughput loss in a channel with serious quality variation since the imperative uniform code rate and modulation mode limit the throughput for data sent over subchannels with high quality (for good channel states).

Channel estimation is more prone to errors for channel states with low quality. With bad channel estimates in the uniform MCS link adaptation, the inclusion of low-quality states effectively subtracts energy from better-quality states.

In FIGS. 1 and 2 it has been shown that the throughput will be higher if the modulation and coding scheme would be adapted to the channel quality level, or the SNR level, if the same block sizes are assumed. Then it may be assumed that the solution would be to use the perfect link adaptation method, where MCS adaptation is done for each subchannel, depending on its quality state. Although, there are other drawbacks with the perfect link adaptation method:

The performance, or actual throughput, is limited since the code blocks have to be made small because each fraction of the codeword has its own MCS. FIG. 2 was a simulation where the same code block size was assumed in the two methods, to be able to compare the throughput of the two methods, regardless of code block size;

Too much overhead is needed to inform the receiver of the MCS used in each code block.

In total, when code block size and size of overhead information is included, for the perfect link adaptation method the actual throughput would be poor.

There are also proposals of mixed-modulation per TTI/frame for link adaptation recently. Such a proposal is described in a standardisation contribution presented at 3GPP TSG RAN WG1 #42 on LTE R1-050942 in London, UK, Aug. 29-Sep. 2, 2005, by NTT DoCoMo, NEC, SHARP, with the title: AMC and HARQ Using Frequency Domain Channel-dependent Scheduling in MIMO Channel Transmission. In this document, modulation adaptation is done for each chunk or subchannel depending on its state or quality level. This scheme causes some performance improvements since higher-order modulation mode is used for subchannels experiencing high SINR, and lower-order modulation mode is used for subchannels experiencing low SINR. However, mixed-modulation scheme requires significant extra signaling cost compared to a single MCS case, since it is necessary to inform the receiver for each transmitted coded and modulated data word fraction which modulation scheme that has been used. If there are four different modulation schemes to choose from, each coded and modulated data word fraction would need to include two bits stating the used modulation scheme.

As shown above, there is a need for achieving high throughput over a channel, and there is space for improving the throughput for a channel experiencing high quality variations.

SUMMARY OF THE INVENTION

An object of the present invention is to achieve a high throughput for data transmitted from a transmission unit to a reception unit over a channel in a wireless communication system, which channel experiences a large quality variation over its frequency range.

The above object is achieved by a method, a transmission unit and a computer program product set forth in the characterizing part of the independent claims.

According to the invention, the throughput for a channel experiencing high quality variations is increased by estimating the quality of each subchannel and classifying the subchannels into a number of quality groups based on the estimated quality of each subchannel, and by selecting one code rate for each quality group. When the data word is coded, each fraction of the data word will be coded according to the selected code rate, depending on to which subchannel the fraction of the coded data word is to be modulated. The channel quality may be estimated by e.g. measuring the Signal to Interference and Noise Ratio (SINR) or the Signal to Noise Ration (SNR) over the channel's frequency range or by measuring the Received Bit Information Rate per subchannel in the reception unit, and communicating the result to the transmission unit.

Simulations have shown that a throughput close to optimal is achieved when the subchannels of a channel experiencing high quality variations are classified into two, three or four groups, three or four groups preferably if the channel experiences a very high quality variation, and two groups if the channel experiences a more moderate channel quality variation. It may also be possible that all subchannels are classified into one and the same group if the channel has low quality variations. A good value for the spreading of channel quality within one group is a spreading of 0.3 in Received Bit Information Rate (RBIR).

An advantage with the present invention is that by classing the subchannels into groups depending on their subchannel quality level, and selecting one code rate per group, the channel throughput for a certain transmit power is increased compared to using a uniform code rate.

A further advantage with the present invention is that a performance similar to using one code rate per subchannel or state can be achieved, but with lower signalling cost. A still further advantage is that if the embodiment of the invention using only two, three or four different quality groups is used, only one or two bits are needed to communicate the used code rate per code block, i.e. a high throughput is achieved with low signalling cost.

Another advantage is that by using any of the methods described in the application for implementing multiple code rates within one coding block, the performance is further increased.

BRIEF DESCRIPTION OF THE DRAWINGS

The invention will in the following be described in more detail with reference to enclosed drawings, wherein.

DETAILED DESCRIPTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In wireless communication systems, especially for wideband systems, and even more especially for wideband systems that are Orthogonal Frequency Division Multiplex (OFDM) based systems, a channel may have a large variation of channel quality over its frequency range, such that a coded and modulated data word would experience channel states of very varying quality when it is transmitted.

Figure 1:
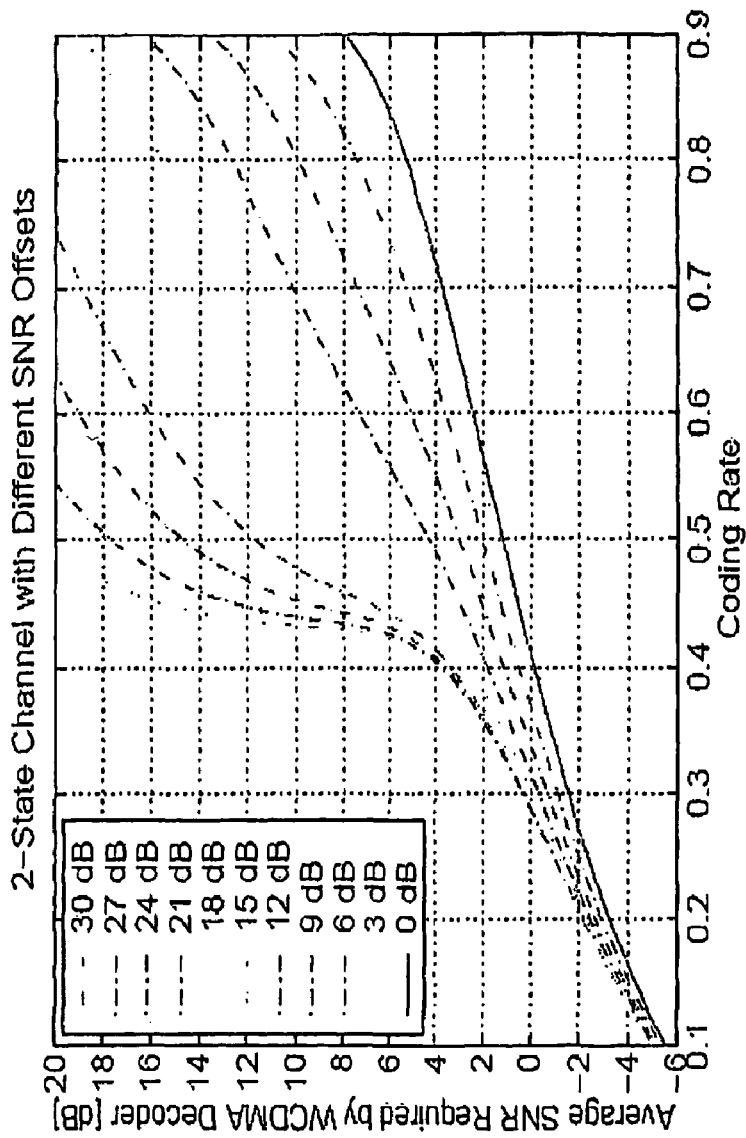
FIG. 1 shows a diagram of results of simulations carried out by the inventors. The diagram shows SNR required by a decoder in a receiver on the y-axis, for different coding rates, on the x-axis.
Figure 2:
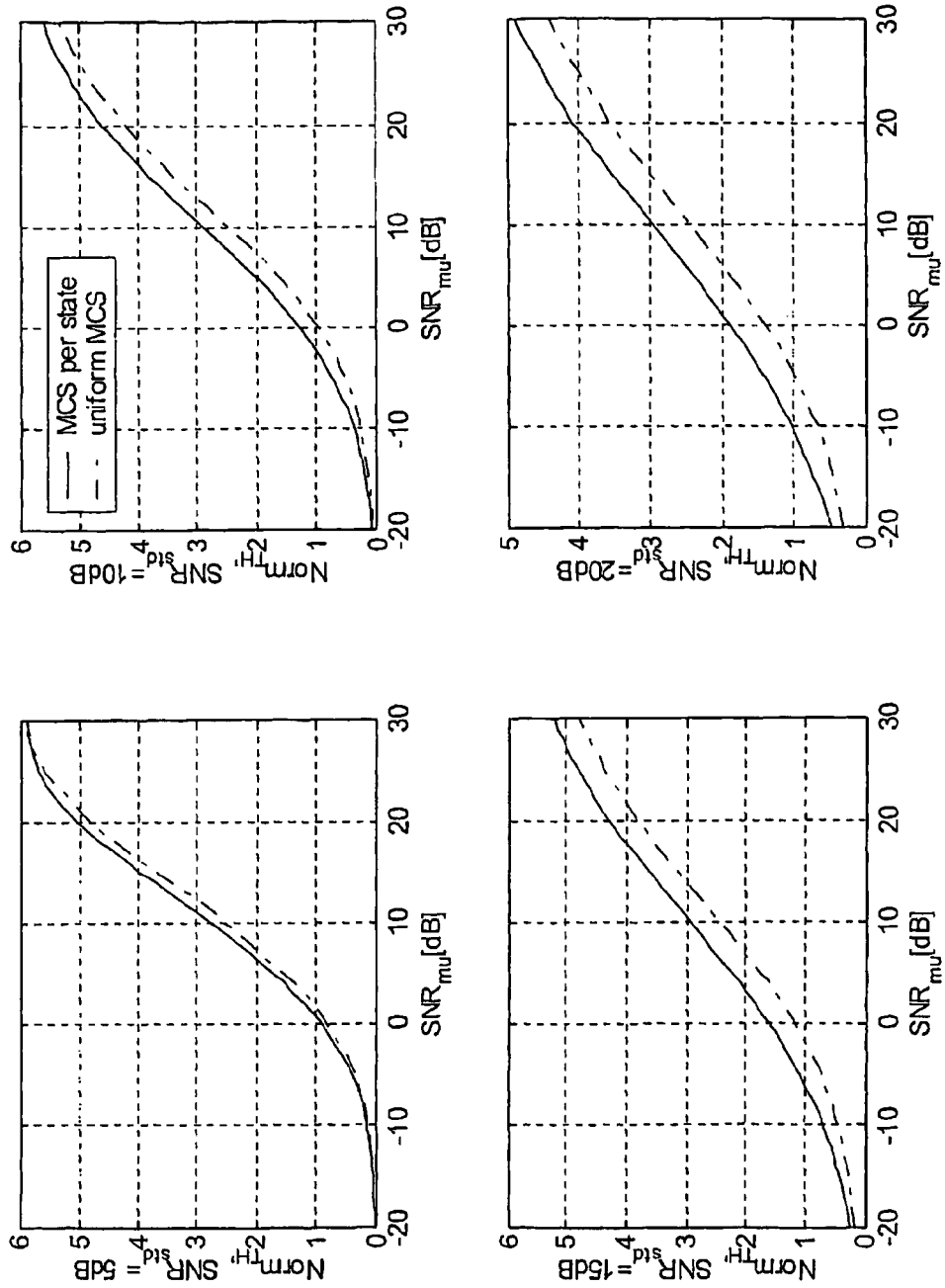
FIG. 2 shows four different diagrams of simulation results of the throughput over a channel for different average values of SNR for the four cases when the standard deviation of the SNR is 5, 10, 15 or 20 dB.

As seen from simulations carried out by the inventors, which results are shown in FIGS. 1 and 2, there are inherent losses in throughput for a channel experiencing high channel quality variation.

To be able to achieve a high throughput of transmitted data even for a channel experiencing high quality variation over its frequency range, it is proposed according to a method of the invention to:

Estimate the quality of each subchannel;
Classify the subchannels into a number of quality groups based on the estimated quality of each subchannel, and
Select a code rate per quality group.

Thereafter the data word that is to be transmitted is coded such that each fraction of the data word is coded according to the selected code rate, depending on to which subchannel the fraction of the coded data word is to be modulated.

I.e. the subchannels are classified into a number of groups, depending on their channel quality levels. For each group a code-rate is selected to maximize or almost maximize the throughput of the group. The data word is coded such that fractions of the data word to be transmitted over a certain subchannel is coded with the code rate selected for the class that the subchannel was classified into.

According to one embodiment of the invention, the code rate for each group could be selected to maximize or almost maximize the throughput of the group as if the group was a constant channel, i.e. a channel with no variation. For optimal link-adaptation of a constant channel, the SINR-to-Throughput map is a convex curve. Therefore, a code rate would be selected for the group according to the following formula:

$$\text{Mean}(\text{throughput}(SINR\_i)) >= \text{throughput}(\text{Mean}[SINR\_i]).$$

The inequality states that the mean value of the throughput as a function of SINR for each individual subchannel in a group would be higher than the throughput as a function of the mean value for all SINRs of subchannels in a group. The code rate per group would be selected according to the right part of the inequality. Since the SINR to throughput is a convex curve, to select code rate according to the right part of the inequality would be an approximation to an optimal selection which would anyhow not be too optimistic. Hence, there is no risk that a too high code rate (i.e. too weak coding) is applied.

A similar formula could be used for RBIR-to-throughput mapping. Other ways of selecting the code rate per group to maximize the throughput of the group may also be used.

By classifying the subchannels into quality groups and choosing one code rate for all subchannels of the class, a code rate more suitable for each subchannel could be selected, compared to if uniform MCS selection is used, which would increase the performance. At the same time, the size of the code blocks could be kept large. Also, especially if the number of groups is kept low, only a small number of bits would be necessary for informing the receiver of the selected code rate. In total, the throughput of the channel would increase compared to using one MCS for the whole channel. Also, since overhead information could be kept low, the throughput would be higher compared to if individual MCSs would be used for each subchannel. The simulations have shown that two, three or four different quality groups is the best selection, because as seen in simulations shown in FIG. 6, the throughput would be high, and also the extra overhead of signaling could be kept low. For example, if only two groups are selected, only one extra bit per code block would be necessary for informing the reception unit of the selected code rate. The optimum number of groups would depend on the variation of channel quality: The higher the variation of the channel quality, the higher the optimum number of quality groups. For very high channel quality variation the optimum would be to have up to four groups, since choosing a better code rate would increase the throughput more than an extra bit of overhead would decrease the throughput. On the other hand, if channel quality variation is low, only one quality group may be sufficient.

Figure 3:
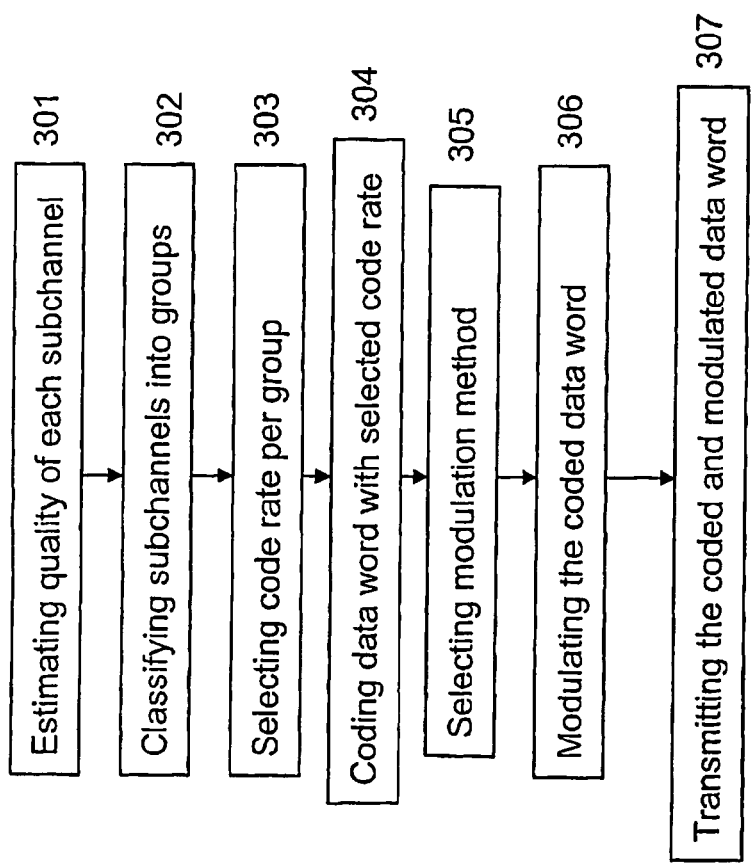
FIG. 3 describes a flow chart according to an embodiment of the method of the invention.

FIG. 3 shows a method according an embodiment of the invention for transmitting data words from a transmission unit to a reception unit over a channel in a wireless communication system. The method starts by estimating 301 a quality of each subchannel of a channel. A subchannel covers a subfrequency interval, which is a fraction of the frequency interval used by a transmission channel. The subfrequency interval covered by a subchannel depends on the estimation method. According to one embodiment, the quality may be estimated based on recently obtained, or instantaneous quality measurements of the channel, sampled for each subfrequency over the frequency interval, or on statistics distribution of the quality. Then the subfrequency interval may depend on how many samples that are taken over the channel frequency interval. After the quality is estimated, the subchannels are classified 302 into a number of quality groups depending on the estimated quality for each subchannel. For each group a code rate is selected 303 that maximizes the throughput of the group. The data word is then coded 304 with the selected code rate such that, depending on to which subchannel a fraction of the coded data word is to be modulated, each fraction of the data word is coded according to the selected code rate. Thereafter, a modulation method is selected 305. The modulation method is selected by e.g. selecting a uniform modulation method for all subchannels, or by selecting modulation method per quality group, or per subchannel, or by any mix of the above. Thereafter, the coded data word is modulated 306, and the coded and modulated data word is transmitted 307 over the channel to a reception unit.

Figure 4:
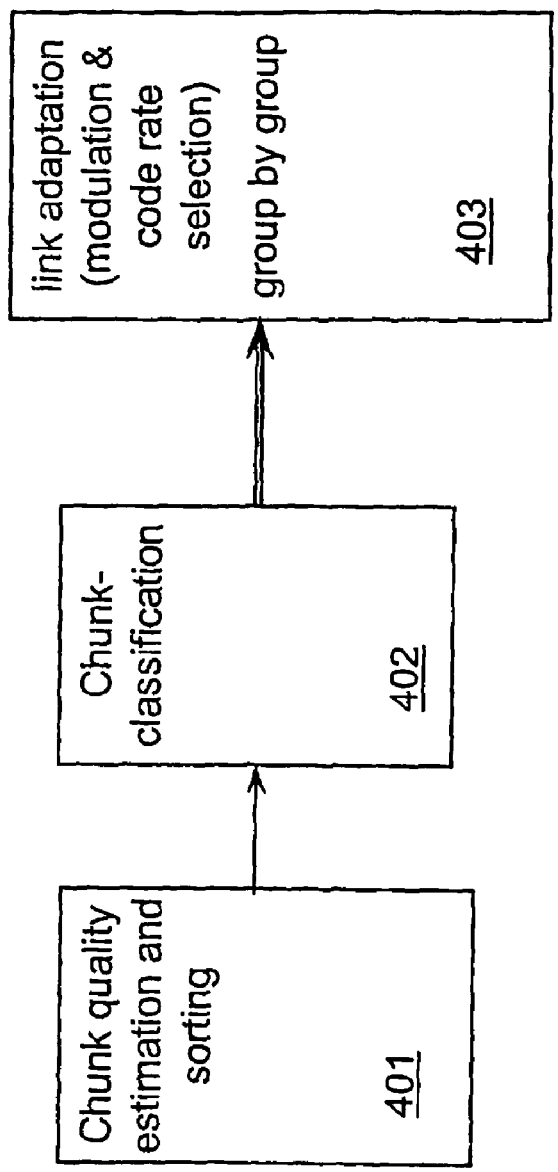
FIG. 4 describes a flow chart according to another embodiment of the method of the invention.

In the following, another method according to the invention is described. The method uses, as an example, the transmission of data from a transmission unit to a reception unit in an Orthogonal Frequency Divisional Multiplex (OFDM) based wireless communication system. FIG. 4 describes a flow chart for multi-code rate link adaptation according to this method. In the method the concept chunk is used for defining a small area in the time and frequency domain with little variation in channel quality. It is comparable to the subchannel in FIG. 3, over a short time period, for which the channel quality is estimated. The method starts by estimating 401 the chunk quality and sorting the chunks accordingly. The estimation may be carried out by the transmission unit or by the reception unit. The chunk quality may for example be estimated by the reception unit measuring the chunk quality and transmitting it to the transmission unit. The chunks are then classified 402 into preferably two, three or four groups, depending e.g. on the channel quality variation. There are different methods to classify the chunks. One example is based on normalized mutual information per coded bit (MIPB), also called received bit information rate (RBIR). The RBIR is a measure of the information transmission efficiency of a chunk to which a certain modulation scheme is applied, at a certain level of noise, if the channel was ideal. Numerical studies have shown that the RBIR is an efficient quality measure to use when defining a quality measure range for a group. The classification is made to limit the RBIR dynamic range to a certain range for each group. According to an advantageous embodiment of the invention, the dynamic RBIR range is limited to approximately 0.3 for each group. The simulations have shown that if each group has a quality variation within RBIR 0.3 or approximately RBIR 0.3, the channel can reach a throughput very close to optimal.) The corresponding simulation results are given in FIG. 6. Thereafter, for each group, the link (or channel) is adapted 403 by selecting modulation mode and code rate, adapted to channel condition, before the data word is coded and modulated with the selected code rates and modulation modes and eventually transmitted to the receiver. Other channel quality indicators may also be used when classifying the chunks or subchannels into groups. The channel quality indicators may be SINR, RBIR, throughput or normalized throughput, or any other non-linear function of SINR, or any other channel quality indicator. After the channel quality has been estimated to get the channel quality indicator, the classification is based on the channel quality indicator.

There are different ways of implementing a different code rate to a data word. According to a first embodiment of the invention, each group has an individual code block with a set code rate.

According to a second embodiment of the invention, the groups share the same code block, but still have different code rates. This requires modifications to rate-matching algorithms and probably to the interleaving pattern as well. In this embodiment, unequal error protection (UEP) is used to set the different selected code rates for different groups. This requires some modifications of rate-matching algorithms to a so called Turbo code defined by the standardization body 3GPP, and published as the technical specification 3GPP TS 25.212, if that code is used, and probably also to the interleaving pattern. Examples of possible methods for unequal error protection are:

To do repetition in the groups that need a low code rate. In this case the initial coding is selected based on the code rate for the best group, i.e. the group that has the highest selected code rate. For groups with lower selected code rates, the code rate is reduced by repeating the coded data over the frequency domain, such that protection capability is increased. The repetition could be done by other implementations, such as spreading with a spreading pattern, etc;

To use uneven puncture rate. In this case the initial coding is based on the group that has the lowest selected code rate. For groups with higher selected code rates, some of the coded bits are removed to achieve the higher code rate. An example of convolutional code is a scheme called Unequal Error Protection, which is based on the Rate-Compatible Punctured Convolutional (RCPC) code. The RCPC code is described in Multirate convolutional codes by Frenger et al, a technical report 21 from the Communications Systems Group of Chalmers University of Technology in April 1998. The convolutional code is the code that decides which bits to remove. It's also based on a mother code, e.g. 1/3 rate, with given puncture pattern in RCPC.

To divide fractions of the data word into different parts, wherein the first part of the fraction of the data word is transmitted over the groups with high quality, and the second part of the fraction of the data word is transmitted over the groups with low quality. For example, the better group with high code rate only contains part of the $1^{st}$ transmitted packet. The group with low code rate contains part of the $1^{st}$ transmitted packet and the $2^{nd}$ transmitted packet. For turbo codes, a Hybrid Automatic Retransmission Request-Incremental Redundancy (HARQ-IR) like structure might be possible. The order of the transmitted bit sequence can refer to that of HARQ-IR. Also, mixes between the first and the second embodiments for implementing different code rates to a data word may be used.

Modulation mode may be selected e.g. for each group. According to one embodiment of the invention, each group has a single modulation mode for all subchannels of a quality group. According to another embodiment of the invention, the modulation mode is adapted to the state of each subchannel, e.g. modulation mode is selected per chunk in the OFDM based system. If modulation mode is selected per chunk or subchannel, more overhead signaling is required.

Figure 5:
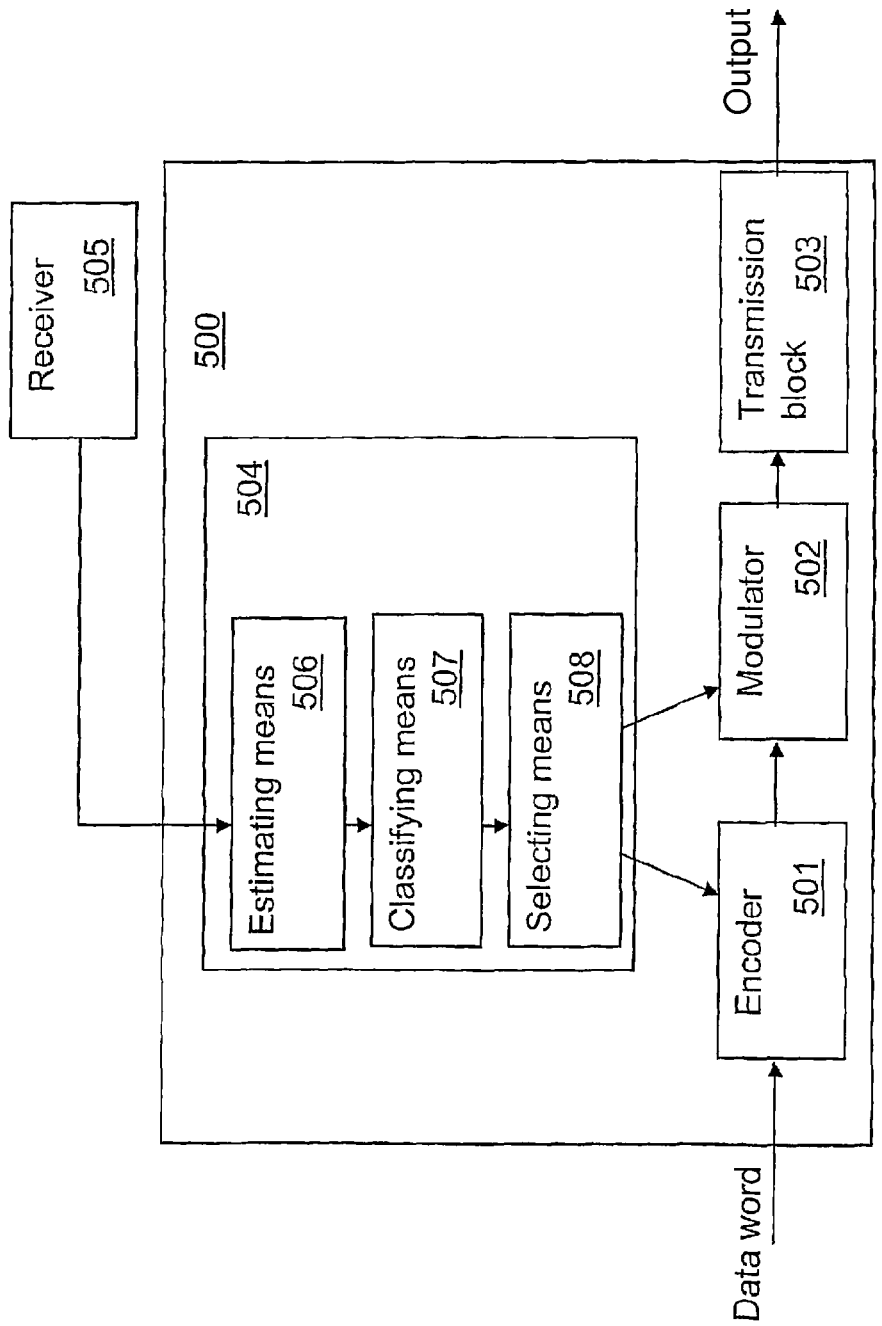
FIG. 5 shows a schematic block diagram of a transmission unit according to an embodiment of the invention.

FIG. 5 describes a transmission unit 500, according to an embodiment of the invention, arranged to transmit data words to a reception unit over a channel in a wireless communication system. The transmission unit comprises a processor 504, which has means for estimating 506 the quality of each subchannel of the channel. The quality of each subchannel may be estimated based on measurements indicating the quality of each subchannel. The measurements may be received in the processor 504 via a receiver 505 of a node in which the transmission unit may be situated, such as a mobile station. The processor 504 also has means for classifying 507 the subchannels into a number of quality groups based on the estimated quality of each subchannel. The processor further has selecting means 508, arranged for selecting a code rate for each group, which code rate maximizes the throughput of the group. The selection means may also be arranged for selecting a modulation method per group or per subchannel. The transmission unit 500 further comprises an encoder 501 for coding a data word such that each fraction of the data word is coded according to the code rate selected by the processor, depending on to which subchannel the fraction of the coded data word is to be modulated. For this reason, the processing unit is arranged to inform the encoder of the selected code rate. The transmission unit also comprises a modulator 502 arranged to receive a coded data word from the encoder 501 and to modulate the coded data word. The processor 504 may also be arranged to inform the modulator 502 of the modulation method that the modulator should use for modulating the coded data word. The transmission unit further comprises a transmission block 503 arranged to receive a coded and modulated data word from the modulator, and to transmit the coded and modulated data word to the reception unit. The means for estimating 506, means for classifying 507 and means for selecting 508 may be separate units in the transmission unit 500, as well as being situated in the processing unit.

The transmitting unit according to the invention has mainly been described as being implemented in hardware. Although, the invention might as well be implemented in software, or in a combination of software and hardware. In this case, corresponding means for performing the steps according to the method claims of the invention may be implemented with computer program software in a transmission unit.

Figure 6:
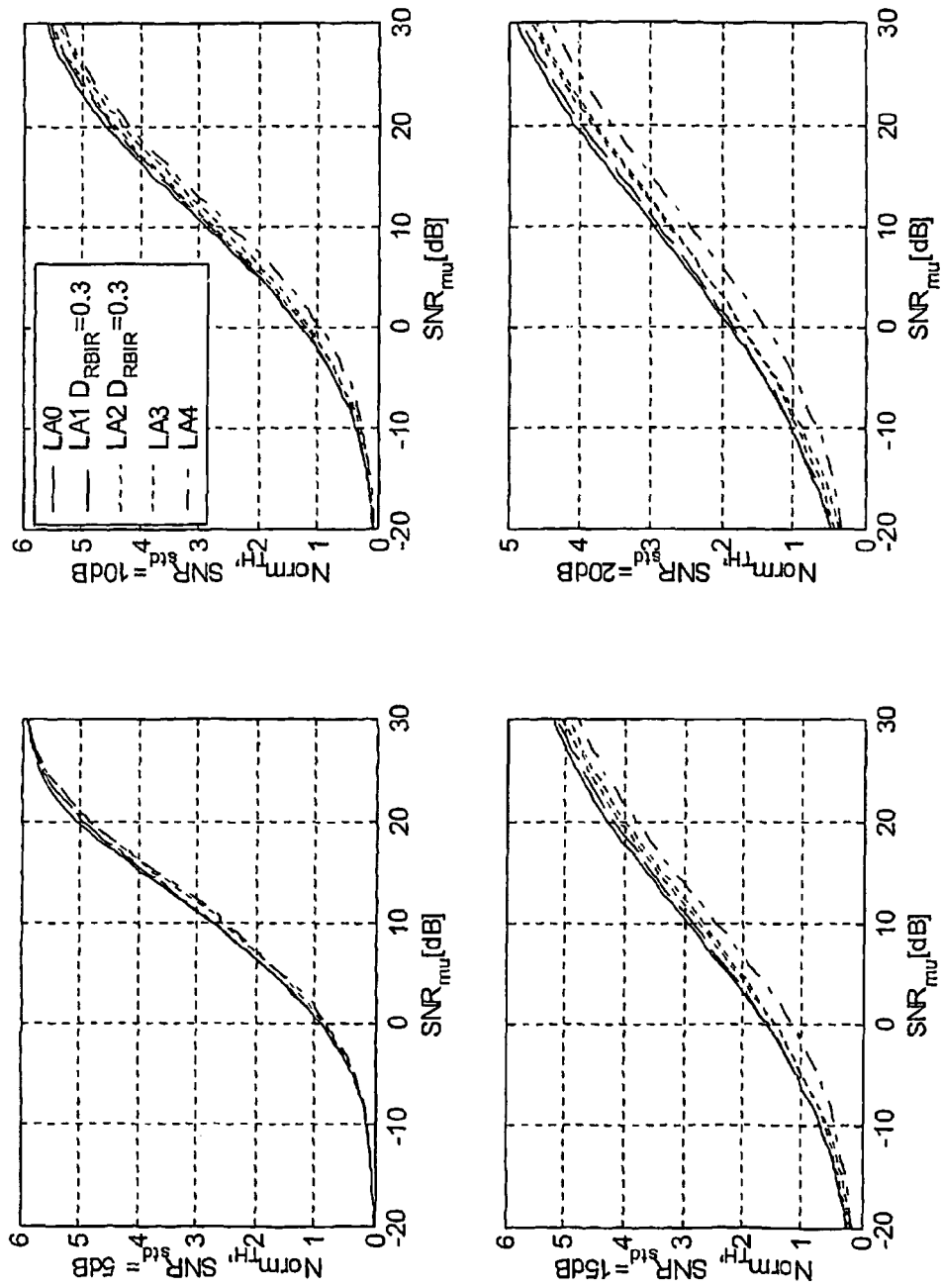
FIG. 6 shows four different diagrams of simulation results comparing different embodiments of the invention to prior art. The diagrams show the throughput over a channel for different average values of SNR when the standard deviation of the SNR is 5, 10, 15 or 20 dB.

FIG. 6 shows simulation results for an OFDM based system. The results show the comparison between different link adaptation solutions. All the solutions are listed as below, where LA1 and LA2 are the ideas proposed by this invention. The example figures are given as Signal to Noise Ratio (SNR) since they are link-simulation results in which SNR equals the Signal to Interference and Noise Ratio (SINR).

LA0: Perfect link adaptation, i.e. modulation and code rate adaptation for each channel state (or each subchannel based on its channel state).

LA1: Multiple code rates, with modulation adaptation per chunk.

LA2: Multiple code rates, with single modulation mode for each code rate (group-wise MCS adaptation).

LA3: Single code rate, with chunk-wise modulation adaptation.

LA4: Single MCS.

The simulation assumptions include:

OFDM system is assumed, with 100 chunks per frame, with 128 symbols per chunk. The transmitted power is common for all the chunks.

The multi-state channel is modelled as 100 states with SNR_dB of normal distribution with the standard deviations of 5 dB in the upper left diagram, 10 dB in the upper right diagram, 15 dB in the lower left diagram and 20 dB in the upper right diagram. The large variation (20 dB) is used to model the cases with very wide band, or when a user is close to a cell border.

The candidate modulation modes used are {BPSK, QPSK, 16QAM, 64QAM}. A BICM-logMAX algorithm is used in the reception unit.

The coding adaptation can select any code rate from 0 to 1 to reach a BLER target of 1%.

Perfect channel knowledge is assumed in both the transmission unit and the reception unit.

The chunk-classification is based on the RBIR, by limiting the RBIR range, denoted as $D_{RBIR}$, of each group within 0.3.

Same code block size is assumed for all link adaptation solutions. Also, no consideration has been taken to different signalling costs due to different header sizes. In FIG. 6 it can be seen that LA1 and LA2 outperforms LA4 obviously when channel varies seriously within one frame. LA1 is very close to the perfect link adaptation, i.e. LA0. LA2 and LA3 are quite close to each other in the performance.

Below the signalling cost for the five different link adaptation solutions are compared:

LA4 only needs the communication of the MCS between transmitter and receiver, therefore it cost the least overhead.

LA2 is the second most efficient, which requires multiple MCS information and extra signalling to tell each chunk about the group index. If only two groups are used, which is proven to be enough for achieving the results according to FIG. 6, one bit is enough to mark the groups index.

LA3 implements a chunk-wise modulation adaptation with a common code rate, therefore its signalling cost is next to LA2. Although only one code rate information bit is needed if only two groups are used, two bits are needed to mark the modulation mode among BPSK, QPSK, 16QAM and 64QAM for each chunk.

LA1 needs some extra signalling than LA3 to tell the information of multiple code rates and the group index to each chunk.

LA0 is the least efficient, because it requires to communicate to the reception unit code rate and modulation mode information for each chunk.

As shown above, the total throughput over a channel experiencing high channel quality variation over its frequency range will increase if the subchannels are classified into groups, and wherein each group would use a selected code rate. By using one code rate per group the signalling cost would be low, especially when only a limited number of groups are used, such as one to four groups depending on the channel variation, but the throughput independently of signalling cost would still be high.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for transmitting a data word from a transmission unit to a reception unit over a channel in a wireless communication system, the channel being divided into a number of subchannels, wherein the channel is allocated a frequency interval for transmission, and each subchannel is allocated a respective subfrequency interval, each subfrequency interval being a fraction of the frequency interval, wherein the method comprises the steps of:

estimating the quality of each subchannel;

classifying the subchannels into a number of quality groups based on the estimated quality of each subchannel;

selecting a code rate per quality group;

coding the data word in a common code block with certain code rates, wherein coding the data word comprises coding each fraction of the data word according to a respective selected code rate depending on to which subchannel the fraction of the coded data word is to be modulated and wherein the different selected code rates per quality group are achieved by an unequal error protection method used in the common code block;

modulating the coded data word onto the number of subchannels, wherein a fraction of the coded data word is modulated onto a subchannel; and transmitting the coded and modulated data word over the channel to the receiver.

2. The method of claim 1, wherein the step of modulating the coded data word comprises:

selecting one modulation method for each quality group, and modulating each fraction of the coded data word according to the selected modulation method, depending onto which subchannel each fraction of the coded data word is to be modulated.

3. Method according to claim 1, wherein the step of modulating the coded data word comprises:
Selecting modulation method for each subchannel, and
Modulating each fraction of the coded data word according to the selected modulation method, depending onto which subchannel each fraction of the coded data word is to be modulated.

4. Method according to claim 1, wherein the step of estimating the quality of each subchannel is based on measurements of the signal to noise ratio, SNR, or signal to interference and noise ratio, SINR, on each subchannel.

5. Method according to claim 1, wherein the step of estimating the quality of each subchannel is based on measurements of a received bit information rate, RBIR, on each subchannel.

6. Method according to claim 5, wherein the subchannels are classified such that the RBIRs for subchannels of the same quality group has a dynamic range not exceeding 0.3.

7. Method according to claim 1, wherein the step of classifying comprises classifying the subchannels into two, three or four different quality groups.

8. Method according to claim 1, wherein fractions of the data word that are to be modulated onto subchannels belonging to different quality groups are coded in separate code blocks.

9. The method of claim 1, wherein the unequal error protection method comprises:
coding the data word with a first selected code rate, and
repeating parts of each fraction of the coded data word that are to be coded with a second selected code rate lower than the first selected code rate, by modulating parts of each fraction of the coded data word that are to be coded with the second selected code rate over two or more subchannels.

10. The method of claim 1, wherein the unequal error protection method comprises:
coding the data word with a first selected code rate, and
removing some of the coded bits from each fraction of the data word that is to be coded with a third selected code rate higher than the first selected code rate, so called uneven puncture rate.

11. A transmission unit in a wireless communication system, adapted to transmit a data word to a reception unit over a channel in a wireless communication system, the channel being divided into a number of subchannels, wherein the channel is allocated a frequency interval for transmission, and each subchannel is allocated a respective subfrequency interval, each subfrequency interval being a fraction of the frequency interval, the transmitter comprising:
a processor adapted to:
estimate the quality of each subchannel;
classify the subchannels into a number of quality groups based on the estimated quality of each subchannel; and
select a code rate per quality group;
an encoder adapted for coding the data word in a common code block with certain code rates by coding each fraction of the data word according to a respective selected code rate depending on to which subchannel the fraction of the coded data word is to be modulated, wherein the encoder is further adapted to achieve the different selected code rates per quality group using an unequal error protection method in the common code block;
a modulator adapted for modulating the coded data word onto the number of subchannels, wherein the modulator is further adapted to modulate a fraction of the data word onto a subchannel; and
a transmission block adapted for transmitting the coded and modulated data word over the channel to the receiver.

12. Transmission unit according to claim 11, wherein the selecting means is further arranged for selecting one modulation method for each quality group, and wherein the modulator is further arranged for modulating each fraction of the coded data word according to the selected modulation method, depending onto which subchannel each fraction of the coded data word is to be modulated.

13. Transmission unit according to claim 11, wherein the selecting means is further arranged for selecting modulation method for each subchannel, and wherein the modulator is further arranged for modulating each fraction of the coded data word according to the selected modulation method, depending onto which subchannel each fraction of the coded data word is to be modulated.

14. Transmission unit according to claim 11, wherein the means for estimating is arranged for estimating the quality of each subchannel based on measurements of the signal to noise ratio SNR, or signal to interference and noise ratio, SINR, on each subchannel.

15. Transmission unit according to claim 11, wherein the means for estimating is arranged for estimating the quality of each subchannel based on measurements of a received bit information rate, RBIR, on each subchannel.

16. Transmission unit according to claim 15, wherein the means for classifying is arranged to classify the subchannels such that the RBIRs for subchannels of the same quality group has a dynamic range not exceeding 0.3.

17. Transmission unit according to claim 11, wherein the means for classifying (507) is arranged to classify the subchannels into two, three or four different quality groups.

18. Transmission unit according to claim 11, wherein the encoder is further arranged to code in separate code blocks, fractions of the data word that are to be modulated onto subchannels belonging to different quality groups.

19. The transmission unit of claim 11, wherein the different selected code rates per quality group are achieved by the encoder being arranged for:
coding the data word with a first selected code rate, and
repeating parts of each fraction of the coded data word that are to be coded with a second selected code rate lower than the first selected code rate, by modulating the parts of each fraction of the coded data word that are to be coded with the second selected code rate over two or more subchannels.

20. The transmission unit of claim 11, wherein the different selected code rates per quality group are achieved by the encoder being arranged for:
coding the data word with a first selected code rate,
removing some of the coded bits from each fraction of the data word that is to be coded with a third selected code rate higher than the first selected code rate.

21. A computer program product comprising non-transitory computer-readable media encoded with instructions, the instructions operable, when executed by a computer device, to:
estimate the quality of each subchannel;
classify the subchannels into a number of quality groups based on the estimated quality of each subchannel;

select a code rate per quality group;

code a data word in a common code block with certain code rates, wherein coding the data word comprises coding each fraction of the data word according to a respective selected code rate depending on to which subchannel the fraction of the coded data word is to be modulated and wherein the different selected code rates per quality group are achieved by an unequal error protection method used in the common code block;

modulate the coded data word onto the number of subchannels, wherein a fraction of the coded data word is modulated onto a subchannel; and transmit the coded and modulated data word over the channel to the receiver.

* * * * *

UNITED STATES PATENT AND TRADEMARK OFFICE
CERTIFICATE OF CORRECTION

PATENT NO. : 8,335,152 B2
APPLICATION NO. : 12/092199
DATED : December 18, 2012
INVENTOR(S) : Wan et al.

It is certified that error appears in the above-identified patent and that said Letters Patent is hereby corrected as shown below:

On the Title Page, Item (57), under "ABSTRACT", in Column 2, Line 7, delete "channel." and insert -- channel, --, therefor.

In Column 1, Line 34, delete "WIMAX" and insert -- WiMAX --, therefor.

In Column 3, Line 8, delete "states)." and insert -- states), --, therefor.

In Column 4, Line 30, delete "classing" and insert -- classifying --, therefor.

In Column 4, Lines 37-42, delete "A still .... cost." and insert the same at Line 38, as a new paragraph.

In Column 5, Line 34, delete "subchannel," and insert -- subchannel; --, therefor.

In Column 7, Line 27, delete "optimal.)" and insert -- optimal. --, therefor.

In Column 8, Line 7, delete "al," and insert -- al., --, therefor.

In Column 8, Line 12, delete "RCPC." and insert -- RCPC; and --, therefor.

In Column 11, Line 1, in Claim 3, delete "Method according to" and insert -- The method of --, therefor.

In Column 11, Line 3, in Claim 3, delete "Selecting" and insert -- selecting --, therefor.

In Column 11, Line 4, in Claim 3, delete "Modulating" and insert -- modulating --, therefor.

In Column 11, Line 8, in Claim 4, delete "Method according to" and insert -- The method of --, therefor.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,335,152 B2

In Column 11, Line 12, in Claim 5, delete "Method according to" and insert -- The method of --, therefor.

In Column 11, Line 16, in Claim 6, delete "Method according to" and insert -- The method of --, therefor.

In Column 11, Line 19, in Claim 7, delete "Method according to" and insert -- The method of --, therefor.

In Column 11, Line 22, in Claim 8, delete "Method according to" and insert -- The method of --, therefor.

In Column 12, Line 4, in Claim 12, delete "Transmission unit according to" and insert -- The transmission unit of --, therefor.

In Column 12, Line 12, in Claim 13, delete "Transmission unit according to" and insert -- The transmission unit of --, therefor.

In Column 12, Line 20, in Claim 14, delete "Transmission unit according to" and insert -- The transmission unit of --, therefor.

In Column 12, Line 23, in Claim 14, delete "ratio" and insert -- ratio, --, therefor.

In Column 12, Line 25, in Claim 15, delete "Transmission unit according to" and insert -- The transmission unit of --, therefor.

In Column 12, Line 30, in Claim 16, delete "Transmission unit according to" and insert -- The transmission unit of --, therefor.

In Column 12, Line 34, in Claim 17, delete "Transmission unit according to" and insert -- The transmission unit of --, therefor.

In Column 12, Line 35, in Claim 17, delete "classifying (507)" and insert -- classifying --, therefor.

In Column 12, Line 37, in Claim 18, delete "Transmission unit according to" and insert -- The transmission unit of --, therefor.